US00RE43024E

(19) United States
(12) Reissued Patent
Parnes et al.

(10) Patent Number: US RE43,024 E
(45) Date of Reissued Patent: Dec. 13, 2011

(54) FORK LIFT APPARATUS ADAPTED TO BE COUPLED TO A TRUCK OR TRAILER

(75) Inventors: Baruch Parnes, Herzeliya (IL); Nachum Frankel, Herzeliya (IL)

(73) Assignee: Samson Lift Technologies LLC, Boca Raton, FL (US)

(21) Appl. No.: 11/352,518

(22) Filed: Feb. 13, 2006
(Under 37 CFR 1.47)

Related U.S. Patent Documents

Reissue of:
(64) Patent No.: 5,915,912
Issued: Jun. 29, 1999
Appl. No.: 08/752,565
Filed: Nov. 21, 1996

U.S. Applications:
(62) Division of application No. 09/894,897, filed on Jun. 29, 2001, now Pat. No. Re. 39,997.

(30) Foreign Application Priority Data

Nov. 22, 1995 (IL) ..... 116100

(51) Int. Cl.
*B65G 67/02* (2006.01)

(52) U.S. Cl. ..... 414/544; 414/501; 414/664; 414/665; 414/666; 414/667; 414/812

(58) Field of Classification Search ..... 414/501, 414/525.1, 544, 663–671, 812
See application file for complete search history.

(56) References Cited

U.S. PATENT DOCUMENTS

| | | | | |
|---|---|---|---|---|
| 2,605,918 | A | 8/1952 | Roscoe | 414/665 |
| 2,985,328 | A | 5/1961 | Fitch | 414/667 |
| 3,031,091 | A | 4/1962 | Erickson et al. | 414/544 |
| 3,167,201 | A | 1/1965 | Quayle | 414/664 |
| 3,168,956 | A | 2/1965 | Jinks et al. | 414/544 |
| 3,187,917 | A | 6/1965 | Miller | 414/664 |
| 3,235,105 | A | 2/1966 | Loomis | 414/544 |
| 3,684,114 | A | 8/1972 | Cosgrove et al. | 414/622 |
| 3,715,046 | A * | 2/1973 | Marklund | 414/632 |

(Continued)

FOREIGN PATENT DOCUMENTS

EP 0775666 A1 5/1997

(Continued)

OTHER PUBLICATIONS

International Search Report and Written Opinion for Application No. PCT/US2006/045798, mailing date Apr. 3, 2007, 7 pages.

(Continued)

*Primary Examiner* — James Keenan
(74) *Attorney, Agent, or Firm* — Morgan Lewis & Bockius LLP

(57) ABSTRACT

A fork lift with retractably extendable loading prongs for lifting loads from either side of a vehicle. The fork lift includes a mechanism for displacing the prongs over and across the vehicle, which mechanism has front and rear transverse girders which can be rigidly secured to the vehicle's chassis. The mechanism further includes front and rear masts, sprocketed wheels mounted on the masts to move the front and rear masts reciprocally, and a longitudinal beam which is coupled to the masts. The longitudinal beam can move up and down. Front and rear uprights extend downwardly from the longitudinal beam. The prongs are retractably engaged to the bottom of the uprights and are moved with hydraulic pistons.

9 Claims, 18 Drawing Sheets

U.S. PATENT DOCUMENTS

| | | | | |
|---|---|---|---|---|
| 3,930,587 | A | 1/1976 | Bliss | 414/664 |
| 4,326,830 | A | 4/1982 | Cusack | 414/470 |
| 4,690,609 | A | 9/1987 | Brown | 414/543 |
| 4,938,652 | A | 7/1990 | Sanderson | 414/718 |
| 4,995,774 | A | 2/1991 | Nusbaum | 414/544 |
| 5,403,105 | A | 4/1995 | Jameson et al. | 401/45 |
| 5,403,145 | A * | 4/1995 | Cradeur et al. | 414/745.3 |
| 5,951,235 | A | 9/1999 | Young et al. | |
| 6,231,294 | B1 | 5/2001 | Young et al. | |
| 2003/0101603 | A1 | 6/2003 | Feldman et al. | 33/227 |
| 2007/0154295 | A1 | 7/2007 | Kuriakose | |

FOREIGN PATENT DOCUMENTS

| | | |
|---|---|---|
| FR | 1309825 | 10/1962 |
| FR | 1546105 | 10/1968 |
| FR | 2305385 | 3/1975 |
| FR | 2325536 | 9/1975 |
| FR | 2278530 | 2/1976 |
| FR | 2517268 | 11/1981 |
| FR | 2503644 | 4/1982 |
| FR | 2592644 | 1/1986 |
| GB | 998365 | 7/1965 |
| GB | 1245590 | 1/1970 |
| GB | 1439145 | 6/1976 |
| WO | 82/01363 | 4/1982 |
| WO | 02/28762 A2 | 4/2002 |

OTHER PUBLICATIONS

*Samson Lift Technologies, LLC* v. *Jerr-Dann Corporation and Oshkosh Corporation,* No. 09-CIV-2493 (S.D.N. Y Mar. 18, 2009)(complaint).

*Samson Lift Technologies, LLC* v. *Jerr-Dann Corporation and Oshkosh Corporation,* No. 09-CIV-2493 (S.D.N.Y May 13, 2009)(answer).

* cited by examiner

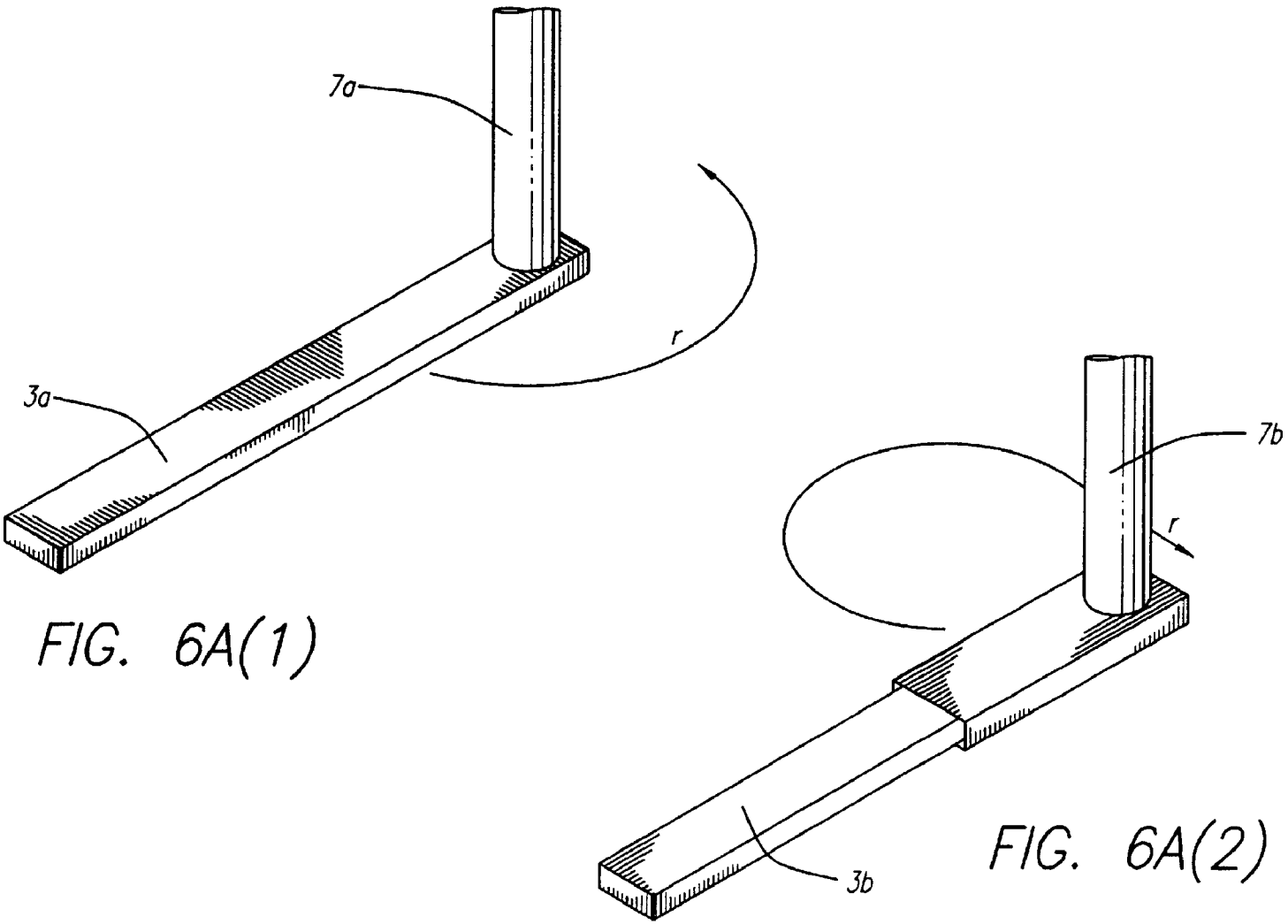
FIG. 6A(2)
FIG. 6A(1)

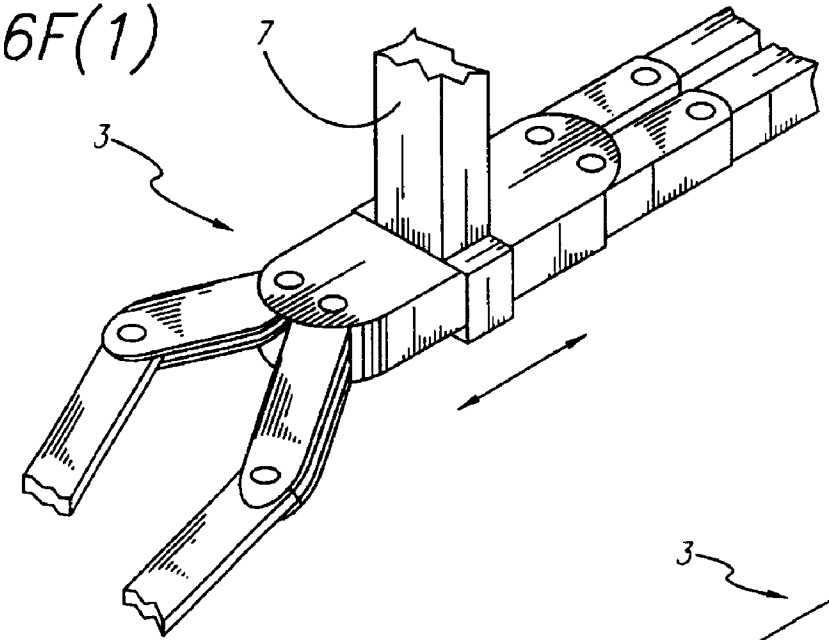
FIG. 6F(1)
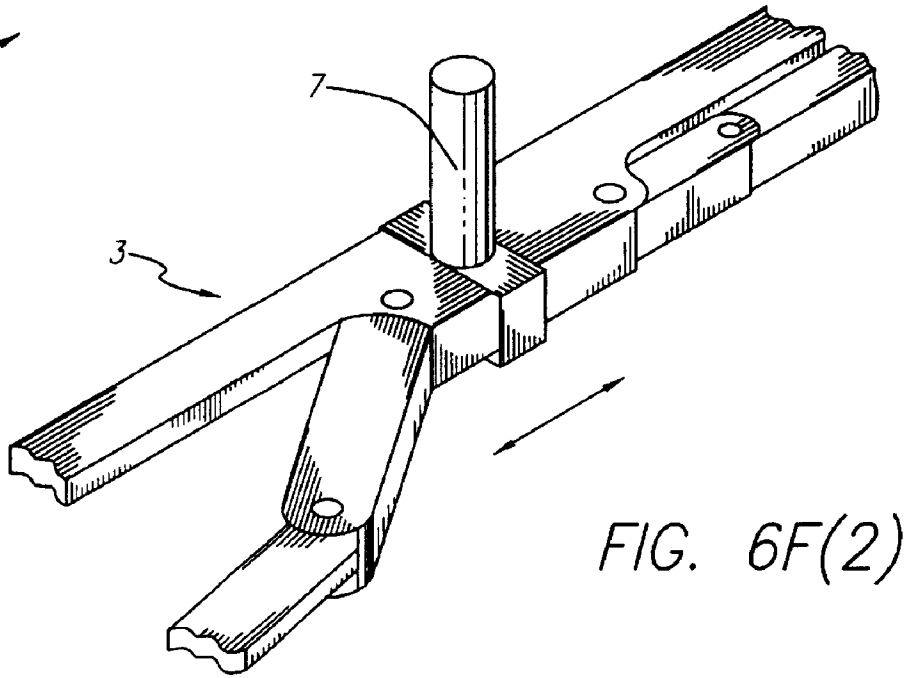
FIG. 6F(2)

FORK LIFT APPARATUS ADAPTED TO BE COUPLED TO A TRUCK OR TRAILER

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 5,915,912. The reissue application numbers are application Ser. Nos. 09/894,897 (now U.S. Pat. No. Re. 39,997) and 11/352,518 (the present application), which is a division of reissue application Ser. No. 09/894,897 filed Jun 29, 2001 now U.S. Pat. No. Re. 39,997.*

FIELD OF THE INVENTION

The present invention concerns load trucks in general, and fork lift apparatus adapted to be mounted on conventional trucks and trailers in particular.

BACKGROUND OF THE INVENTION

Lift-trucks are widely used for loading, lifting, handling and carriage of heavy loads, such as large containers and cars. Typically, a designated lifting-vehicle comprises an built-in fork lift mechanism, which is preferred over elaborate crane lifts. Relatively light weights can be loaded in front or back of non-designated vehicles, without significantly endangering the stability of the lifting-vehicle. However, heavy loads must be loaded in proximity to the center of gravity in order to avoid turning over of the lifting-vehicle during the loading and unloading process, especially while the lifting-vehicle is in motion. Hence, conventional fork lift trucks comprise a designated truck having a fork lift mounted in front thereof, with a balancing counterweight mounted in the rear of the truck. In certain cases the mast of the fork lift is tilted in order to maintain the center of gravity.

Still, for some purposes, such as for towing cars and other vehicles, it is preferable to use a retractable fork lift mechanism which is mounted on the side (or rear) of the lifting-vehicle. In the latter cases, when the vehicle is in motion, the prongs of the fork overlappingly rest over the lifting-vehicle's frame, with or without cargo. During the process of loading and unloading, the prongs extend from the frame of the vehicle and lift the cargo—from underneath, in a combined downward-upward and traversing motions. The prongs are situated during this process anywhere between the ground and at some elevation above the chassis of the lifting-vehicle. To enable these combined motions, the chassis of the lifting-vehicle is designed as an open, II shaped rectangle, whereby the prongs reciprocate through the open side of the chassis.

In the latter cases, the open side of the chassis is usually located at the side of the lifting-vehicle—as required, for example, for loading and towing away cars which are unlawfully parked along the sides of a street. In such embodiments most of the weight of the lifting-vehicle itself is predisposed at the side of the lifting vehicle. This results from the accumulation of the necessary lifting equipment on the closed side of the II-shaped chassis. Although such accumulation contributes to counter-balance the weight of the loaded cargo, it is disadvantageous when there is no cargo loaded or when the loaded cargo is relatively lightweight.

The above embodiment entails several further disadvantages: The requirement of a II-shaped chassis necessary for the task of side loading, excludes the possibility of using conventional trucks and trailers having a "closed" chassis.

In addition, due to the unbalanced lack of a support beam in the open side of the II-shaped chassis, the strength of the chassis is disproportional reduced, even when the other support beams are reinforced, and especially when the chassis lacks a longitudinal support beam. Such weakened chassis is therefore suitable for transportation via regular roads and highways and the use of such lift trucks is usually restricted to special loading zones.

Moreover, the II-shaped chassis poses a serious obstacle for the power transmission from the engine, mounted on one side of the loading vehicle, to the wheels which are mounted on the other side of the vehicle. Similar problems arise with regard to the brake system and the shock-absorbers and even the very engagement of the wheels to the chassis is problematic with the II-shaped chassis.

In view of the above constructural restraints of such lift-trucks, which are designed for lifting a heavy load from their side, they comprise a hydraulic power source which serves both the motion of the vehicle on the ground and the operation of the lifting mechanism. Therefore, their speed on regular roads must be further restricted due to the hydraulic power source which is inferior to regular combustion engines.

Furthermore, some conventional fork lifts carry the load on the prongs while the lift-truck is in motion, a method which is unsafe and may *be* damaging to the load.

Finally, the II-shaped chassis is restricted to lifting loads from one side only of the lifting vehicle, a restriction which can be a major disadvantage. Such is the case, for instance, of a lifting truck used for towing-away cars which are unlawfully parked on both sides of a narrow street. When the lifting-truck is confined to drive in one direction only, the lifting of cars is possible only on one side of the road.

It is therefore, an object of this invention, to provide novel fork lift adapted to the loading of light and heavy loads on the side of the fork lift, which overcomes the above disadvantages.

In particular, an object of this invention is to provide a fork lift which can be mounted on conventional chassis of a vehicle, such as conventional trucks or trailers, and which can be dismounted therefrom.

Another object of this invention is to provide a fork lift which will enable the lifting vehicle to move fast and safely in roads and highways, using a safe chassis and enabling the use of combustion engine for the drive of the vehicle.

A further particular object of this invention, is to provide a fork lift which can be used for lifting loads from either side of the lifting vehicle.

Yet, a further object of this invention is to provide a fork lift wherein the loaded cargo can be safely supported - and is not carried by the prongs of the fork lift while the vehicle is in motion.

These and other objectives are provided by the invention to be described below.

SUMMARY OF THE INVENTION

There is thus provided according to the present invention a novel fork lift comprising retractably extendible loading prongs for lifting loads from either side of a vehicle, and a mechanism for displacing the prongs over and across the vehicle. The vehicle may comprise a non-designated truck or trailer.

According to a preferred embodiment, the mechanism for displacing the prongs comprises a front and a rear transverse girders adapted to be rigidly secured to a chassis of the vehicle, a front and a rear masts, means for simultaneously reciprocating the front and rear masts at their bottoms along the front and rear girders, correspondingly, a longitudinal beam coupled to the front and rear masts, means for reciprocating the beam in a downward-upward motion along the front and rear masts, respectively, a front and a rear uprights extending downward from the beam, the prongs comprise a front and a rear transverse prongs retractably engaged to the bottom of the front and rear uprights, correspondingly, and means for extending the front and rear transverse prongs from the front and rear uprights, correspondingly, toward either side of the vehicle.

Preferably, the beam comprises means, such as hydraulic pistons, for longitudinally moving the front or rear uprights along the beam and may also comprise means for lowering or raising the front or rear uprights.

Optionally, the lift fork further comprises a set of 4 extendible strut poles rigidly secured to the chassis for providing additional security against turning over of the vehicle during the process of loading and unloading. The lift fork may further comprise retractable deck-plates for placement of cargo during transport.

In the preferred embodiment, the means for simultaneously reciprocating the front and rear masts along the front and rear girders, may comprise sprocket wheels, preferably propelled by a hydraulic drive, wherein at least one sprocket wheel is mounted on each mast and is turned against mating toothed sprocket bars which are mounted on the front and rear girders, respectively.

Yet, another optional addition to the preferred embodiment, is a boom to which the front and rear masts are coupled at their tops, and optionally the means for reciprocating the beam in a downward-upward motion comprises front and back hydraulic pistons mounted on the boom, wherein each piston is coupled to a chain which is connected to the beam, through a system of pulleys.

Further optionally, the means for simultaneously extending the front and rear transverse prongs from the front and rear uprights, comprises sprocket wheels, each having a hydraulic drive, wherein each sprocket wheel is mounted on each upright and is turned against mating toothed sprocket bars which are mounted on the front and rear transverse prongs.

In an alternate preferred embodiment, the prongs comprise either horizontally or vertically pivotal prongs, wherein the prongs can be extended toward either side of the vehicle by their pivoting 180° or 90°. Optionally, the pivotal prongs comprise L-shaped double prongs which can be extended toward either side of the vehicle by their pivoting 90°. Further optionally, the prongs may be split prongs.

In a further alternate embodiment the mechanism for displacing the prongs comprises a front and a rear heightened girders adapted to be rigidly secured to the chassis of a vehicle, a longitudinal beam mounted to the front and rear girders, means for reciprocating the beam along the front and rear girders, front and rear uprights extending downward from the beam, means for reciprocating the front and rear uprights in a downward-upward motion, the prongs comprise a front and a rear transverse prongs retractably engaged to the bottoms of the front and rear uprights, correspondingly, means for extending the front and rear transverse prongs from the front and rear uprights, correspondingly, toward either side of the vehicle. Alternately, the front and rear girders may be combined with raising and lowering mechanisms for providing the downward-upward motion of the beam in lieu of the means for reciprocating the front and rear uprights.

In yet a further alternate embodiment, the mechanism for displacing the prongs comprises a front and a rear arches adapted to be rigidly secured to a chassis of the vehicle, a longitudinal beam mounted on the front and rear arches, means for driving the beam along the arches, the prongs comprise a front and a rear transverse prongs retractably engaged to the beam, means for extending the front and rear transverse prongs from the beam toward either side of the vehicle, and means for retaining the prongs in a horizontal configuration.

Further features and advantages of the invention will be apparent from the description below, given by way of example only.

BRIEF DESCRIPTION OF THE INVENTION

The present invention will be further understood and appreciated from the following detailed description, taken in conjunction with the following enclosed drawings in which like numerals designate correspondingly analogous elements or sections throughout, and in which.

Figure 6C:
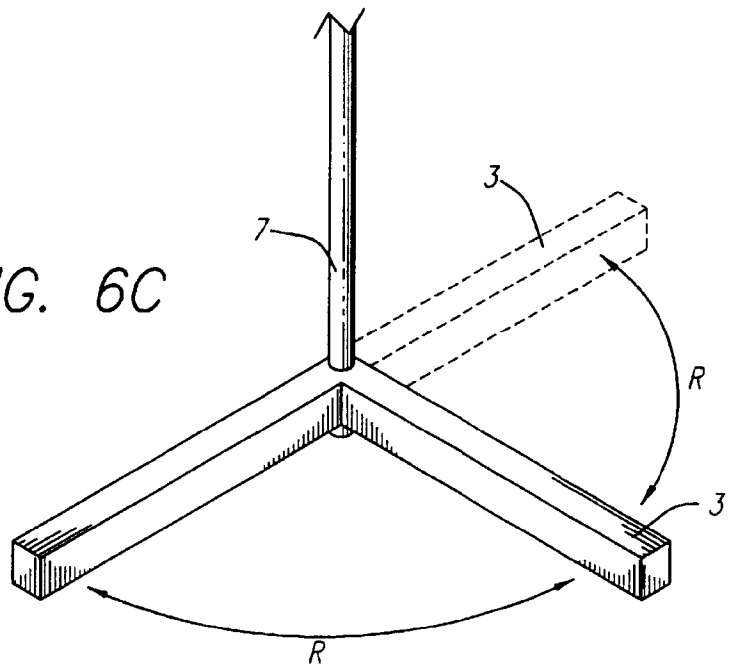
Figure 6B:
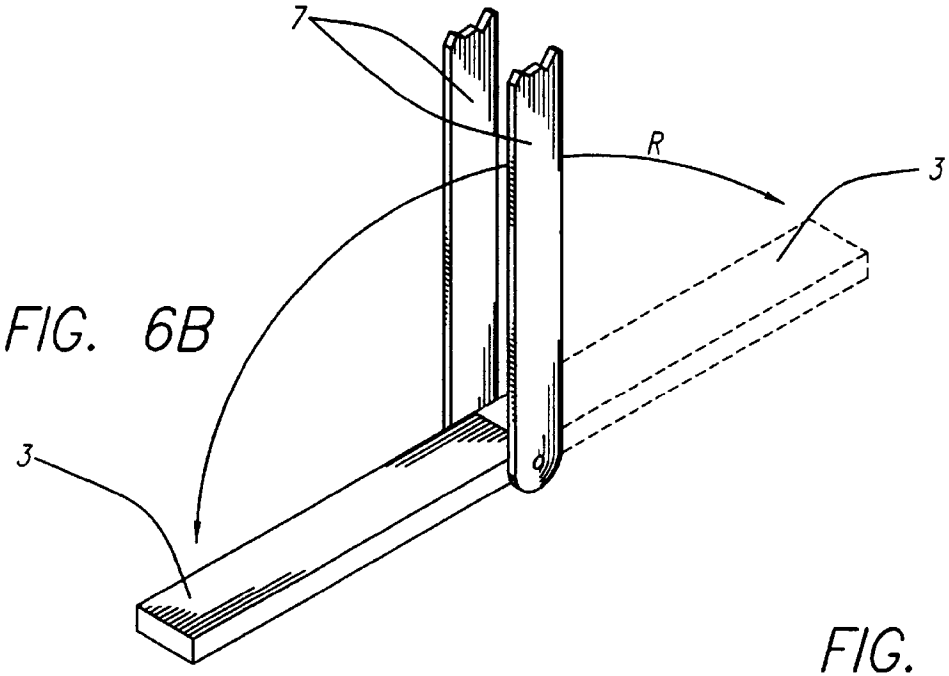
Figure 6D:
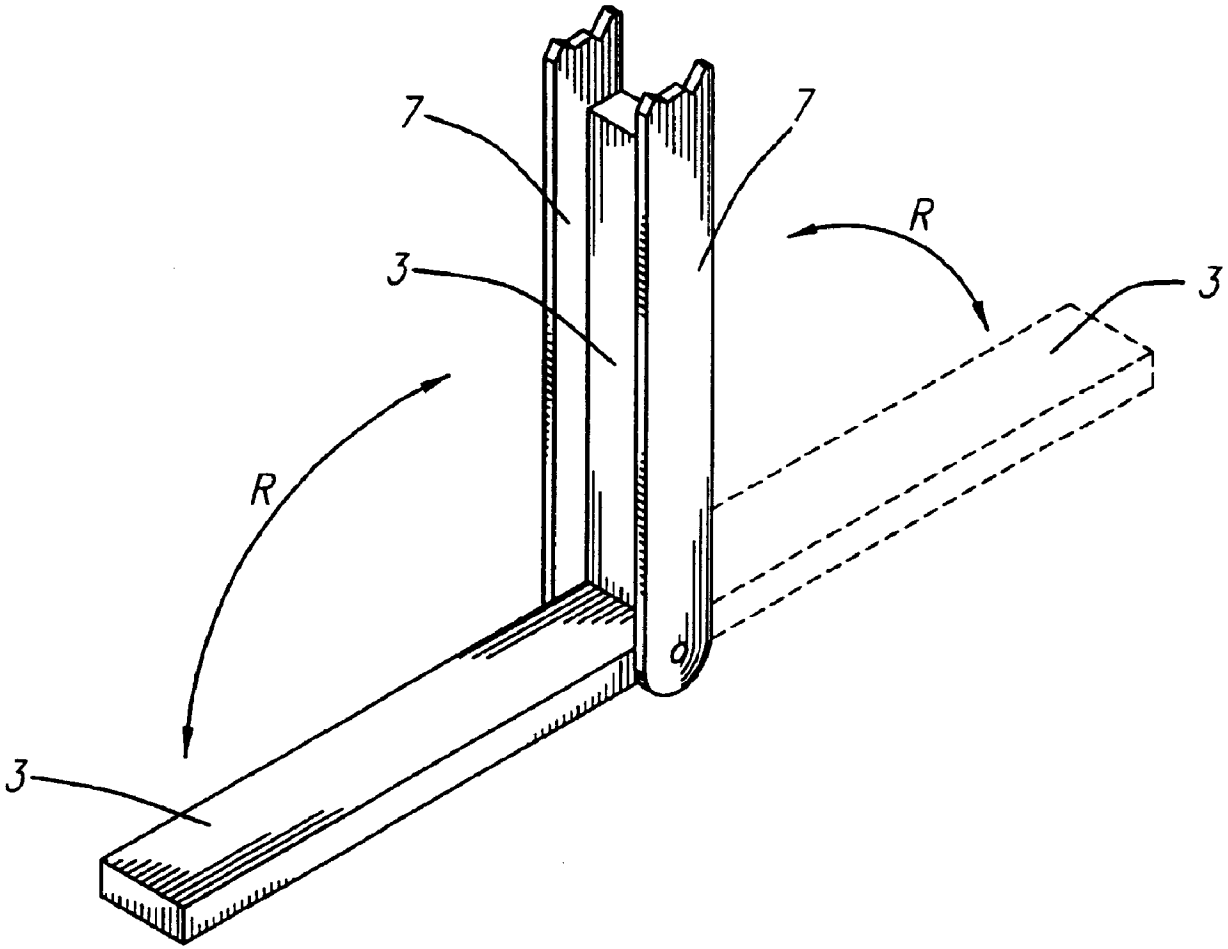
Figure 6E:
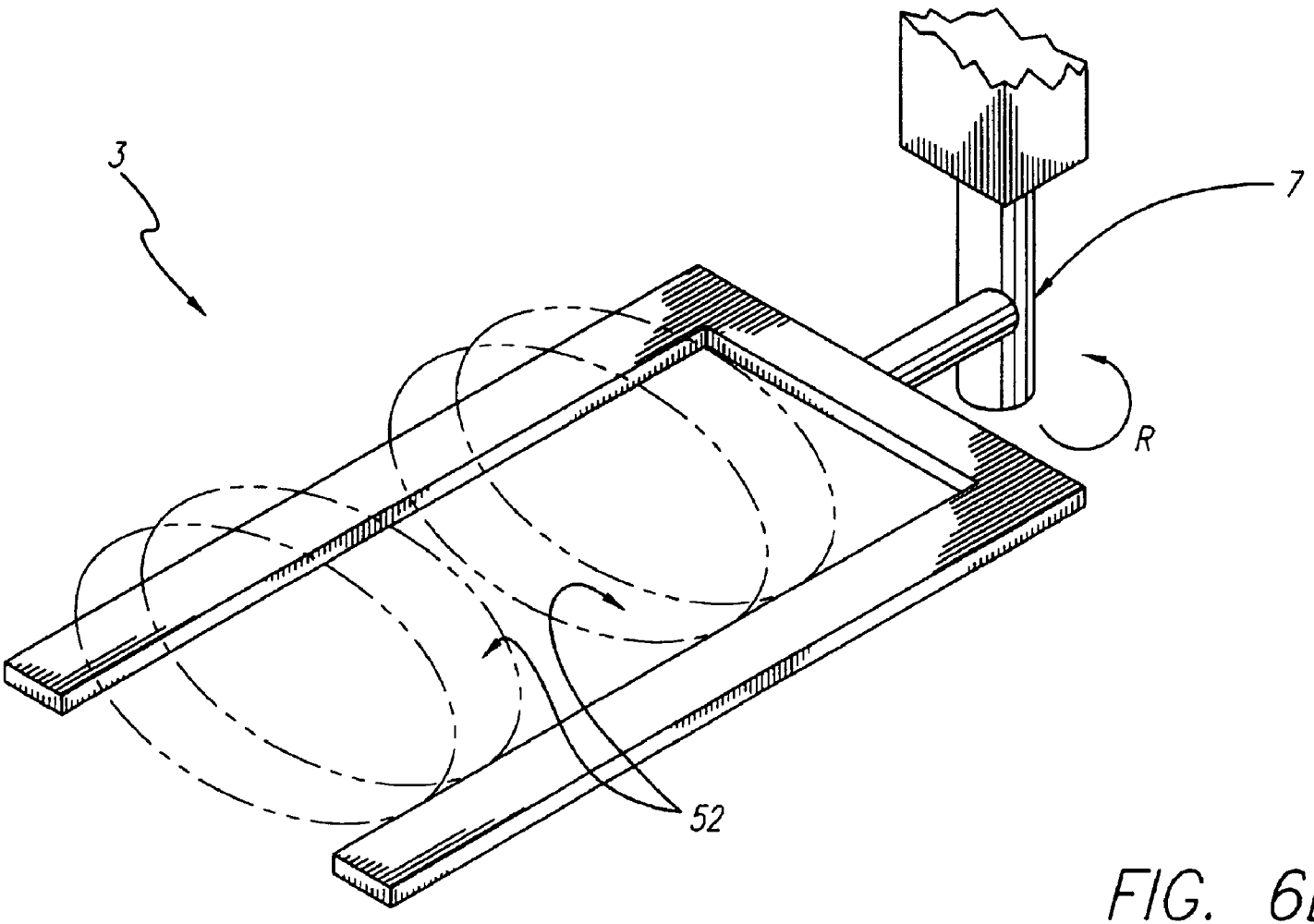
Figure 7A:
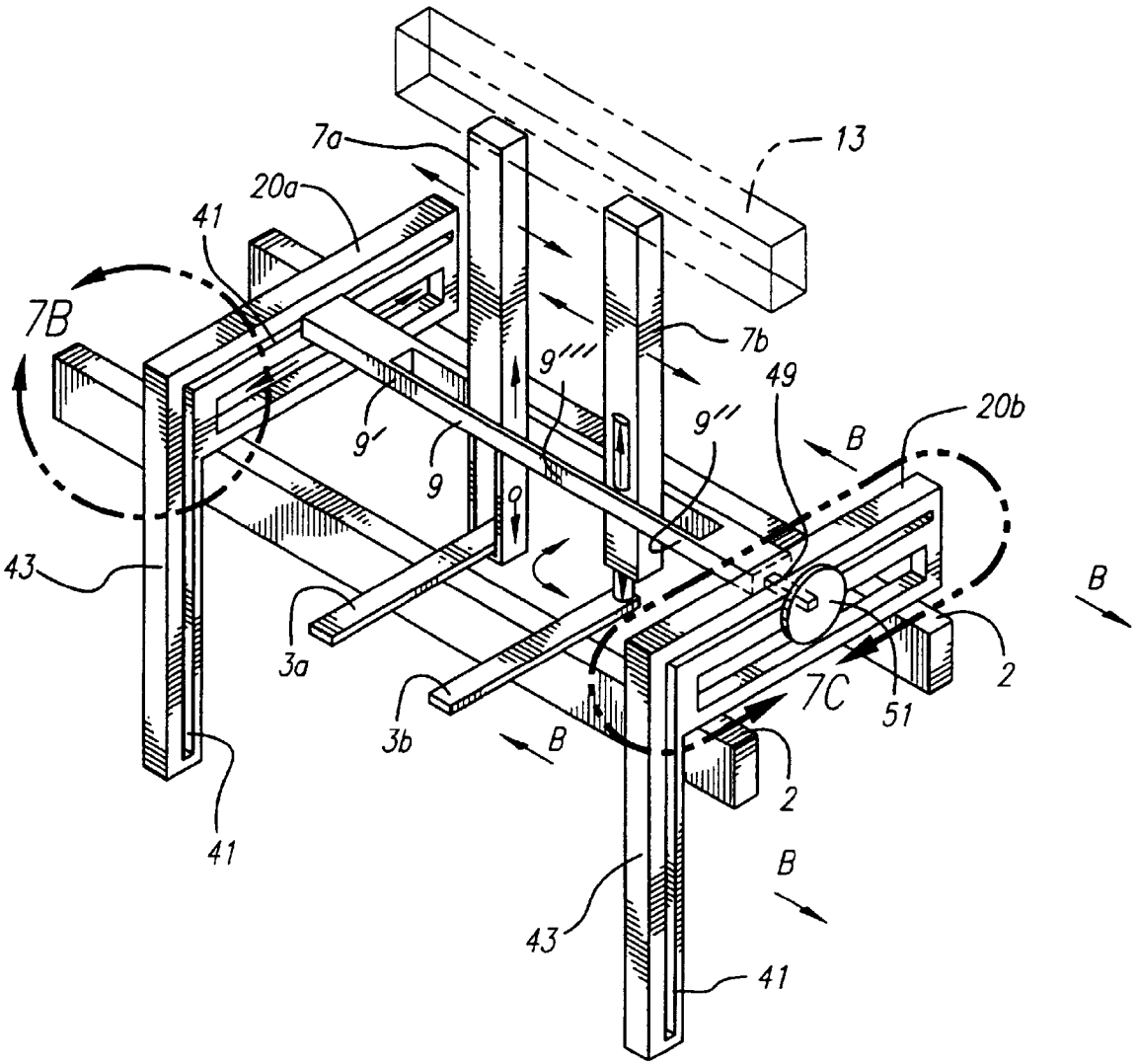
Figure 7B:
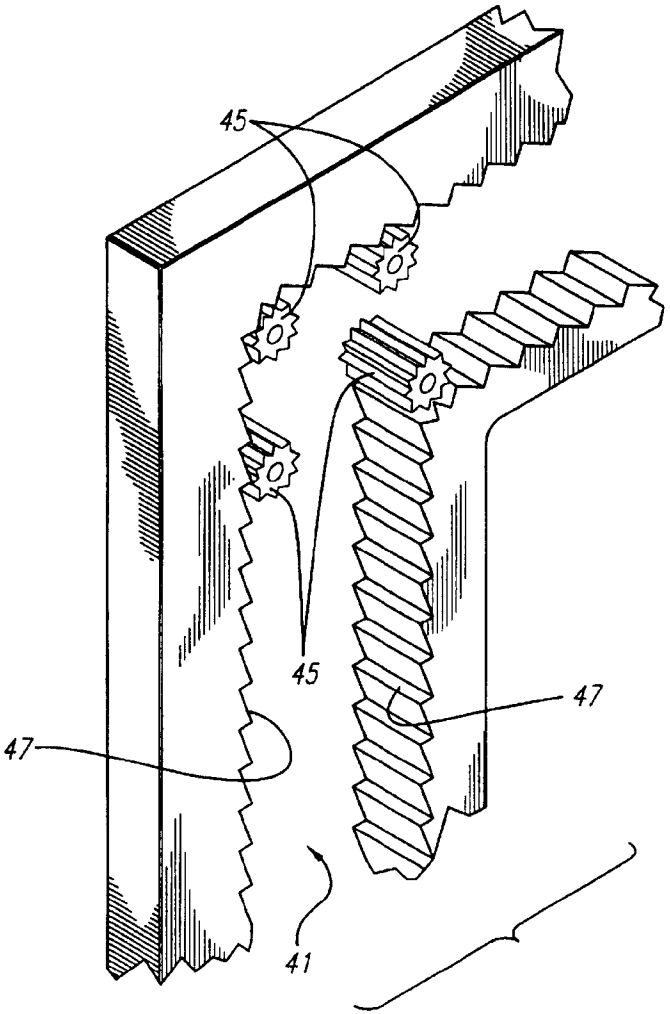
Figure 7C:
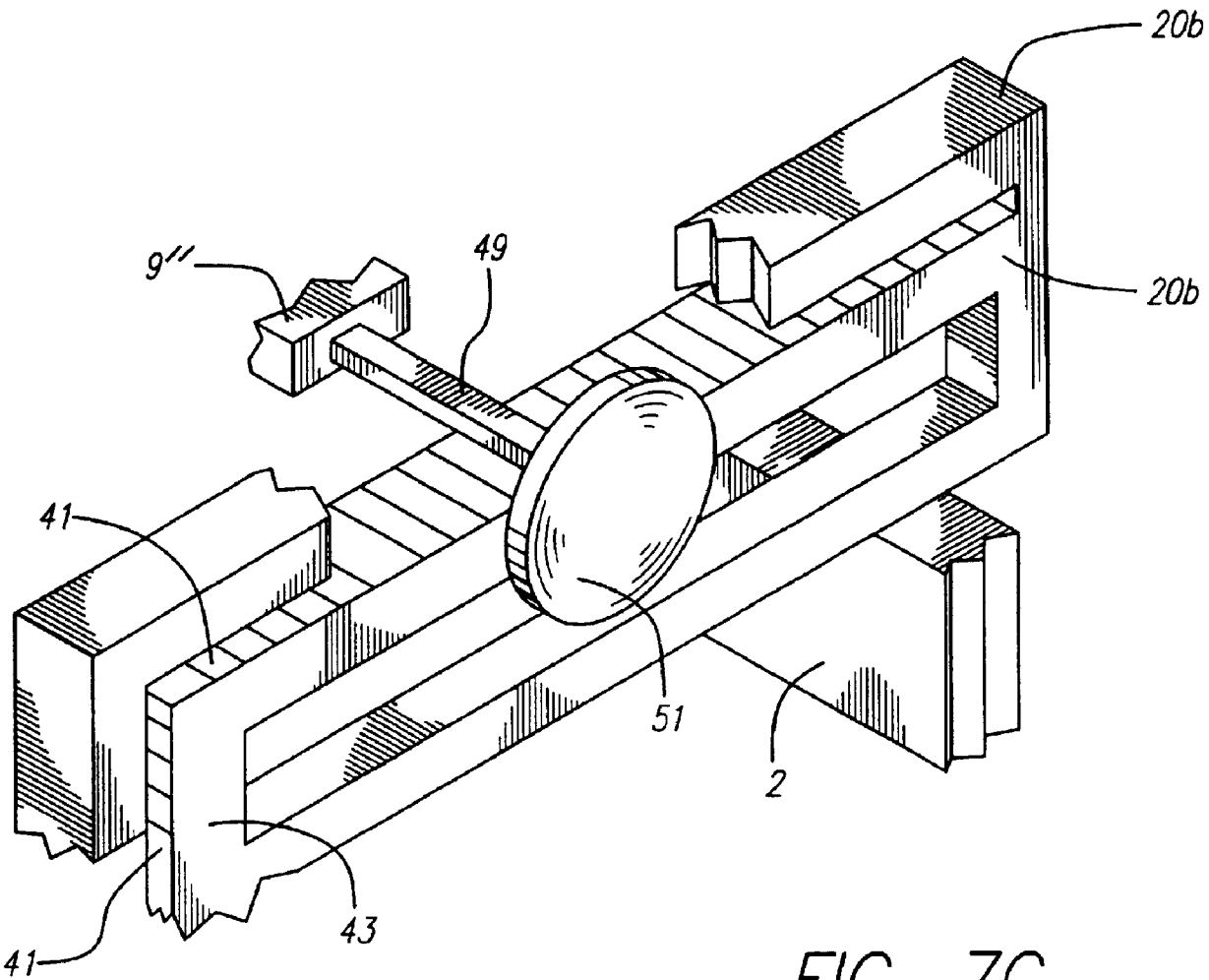
Figure 8:
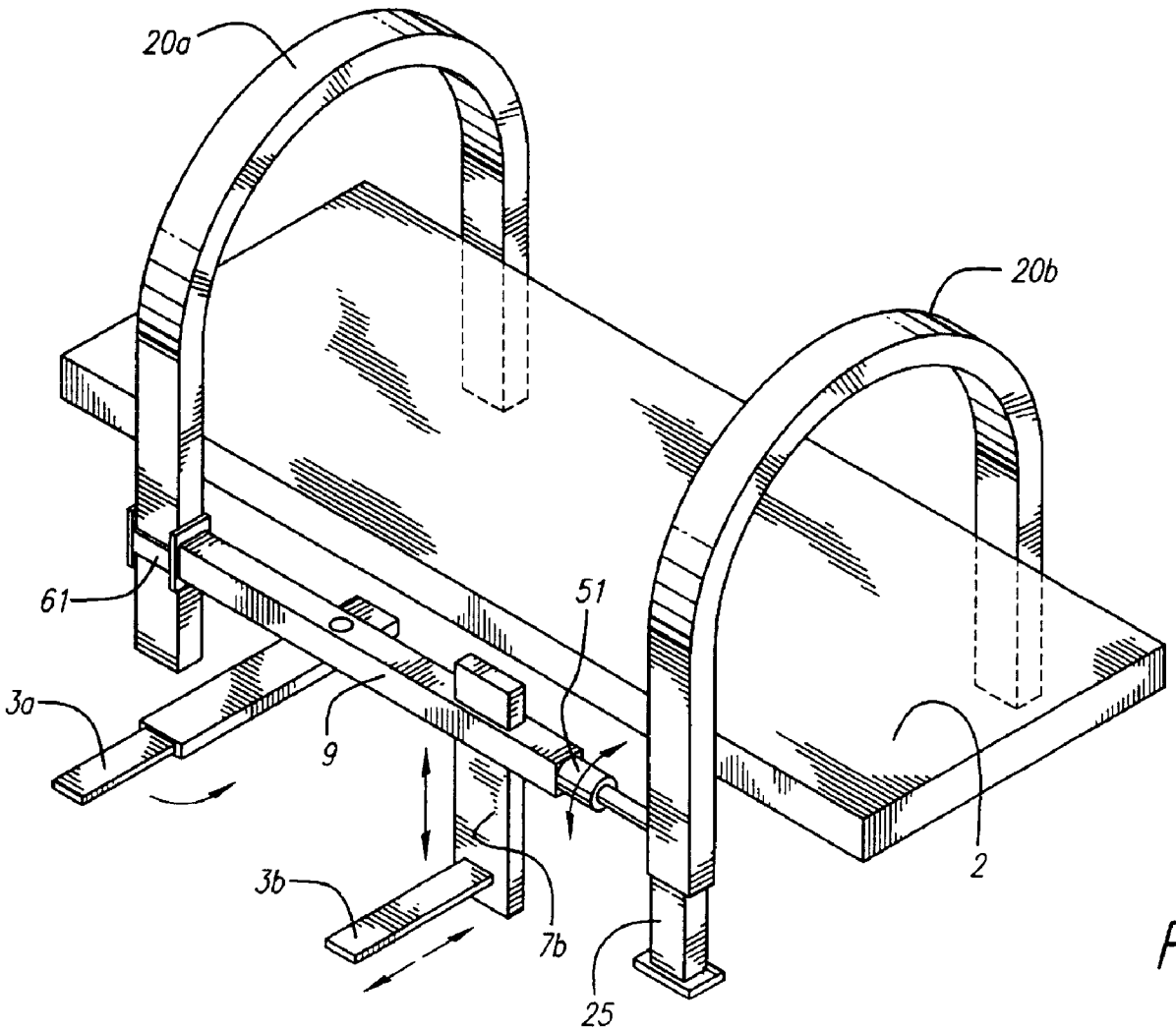
Figure 9A:
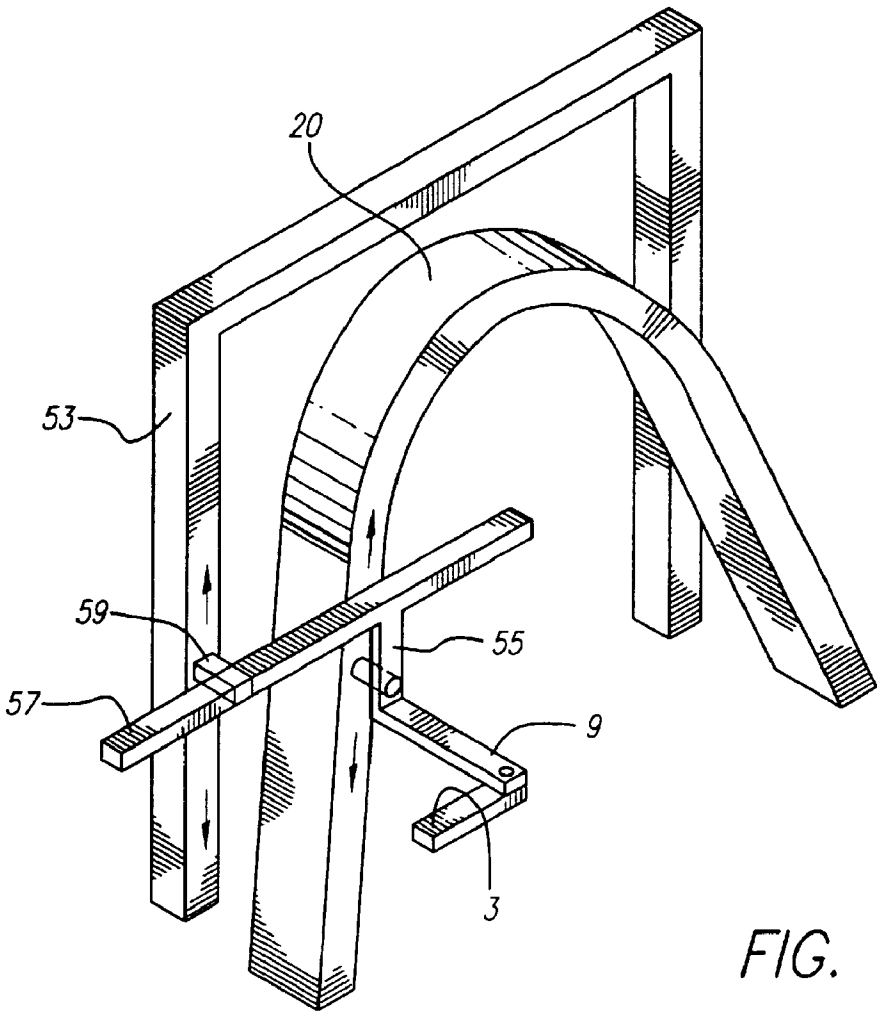
Figure 9B:
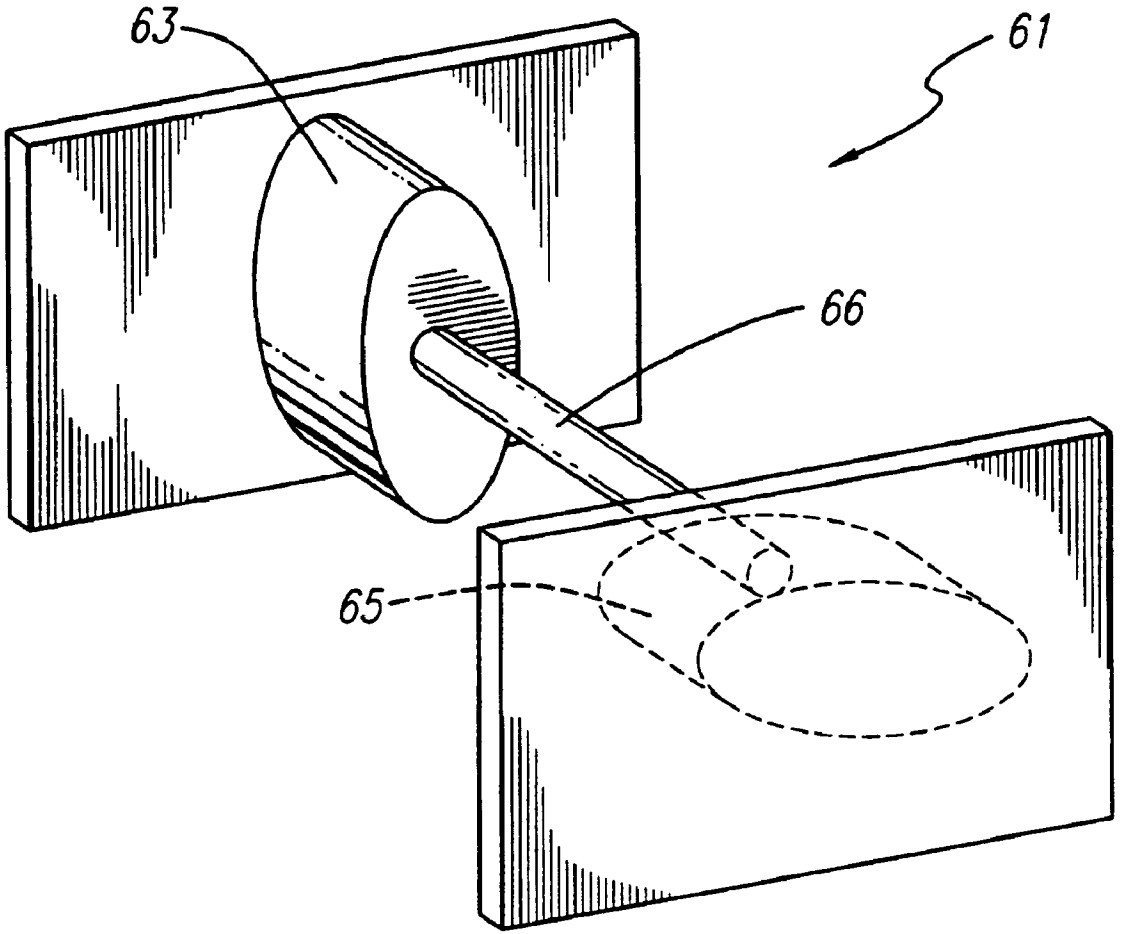
Figure 9C:
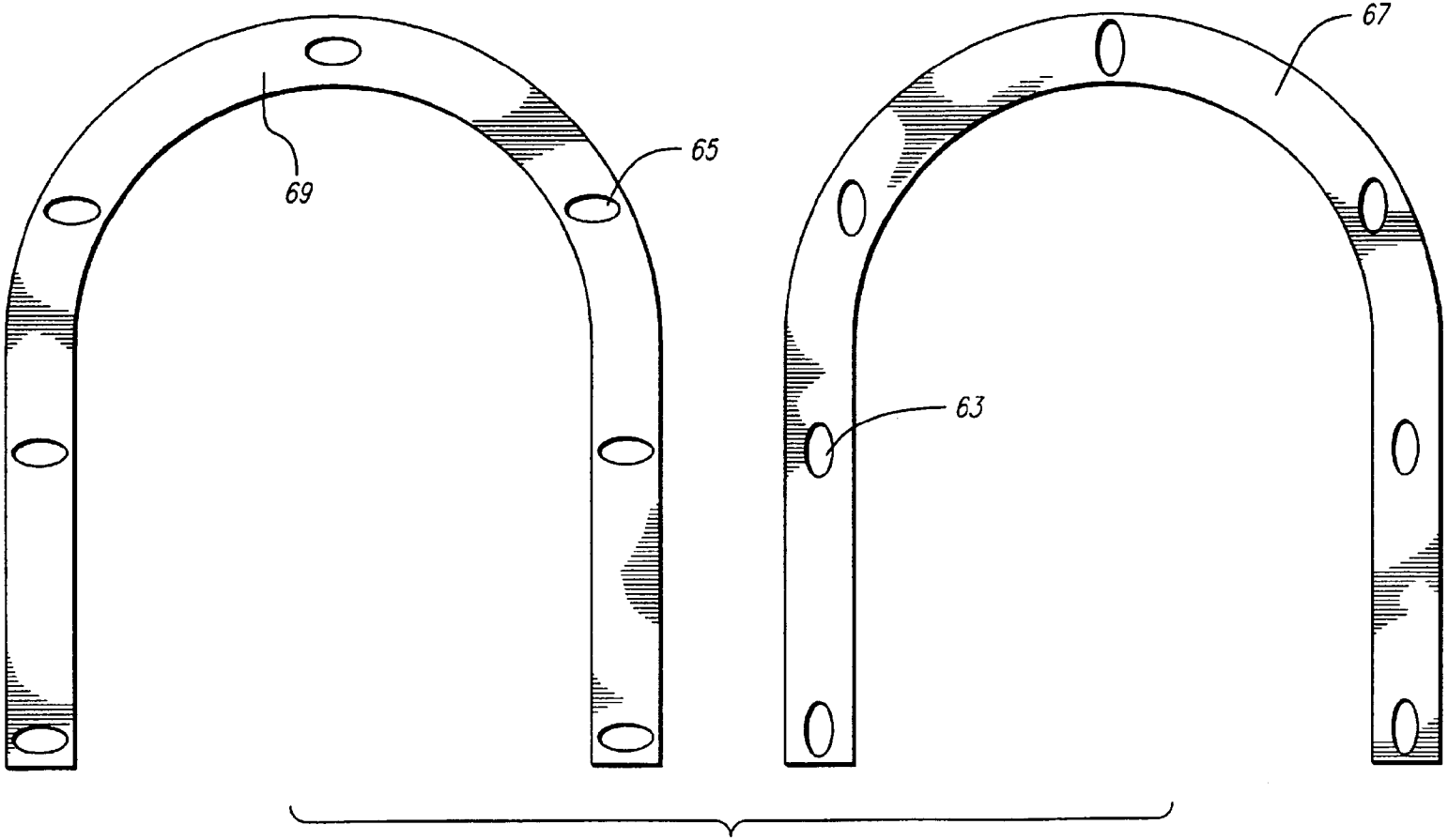

FIGS. 6a(1)–6d are examples of optionally swinging prongs constructed and operative in accordance with the invention;

In FIGS. 6e–6f(2), there are shown examples of split prongs constructed and operative in accordance with the invention;

FIG. 7a is a perspective overall view of a fork lift constructed and operative in accordance with another embodiment of the invention;

FIGS. 7b–7c are perspective partial enlarged views of a segments of the embodiment of FIG. 7a;

FIG. 8 is a perspective overall view of a lift fork constructed and operative in accordance with a further embodiment of the invention;

FIGS. 9a–9b are demonstrations of means for retaining horizontal configuration of the prongs in the embodiment of FIG. 8;

FIG. 9c is a schematic presentation of the rails of the conserving means shown in FIG. 9b.

DETAILED DESCRIPTION OF THE INVENTION

Figure 1:
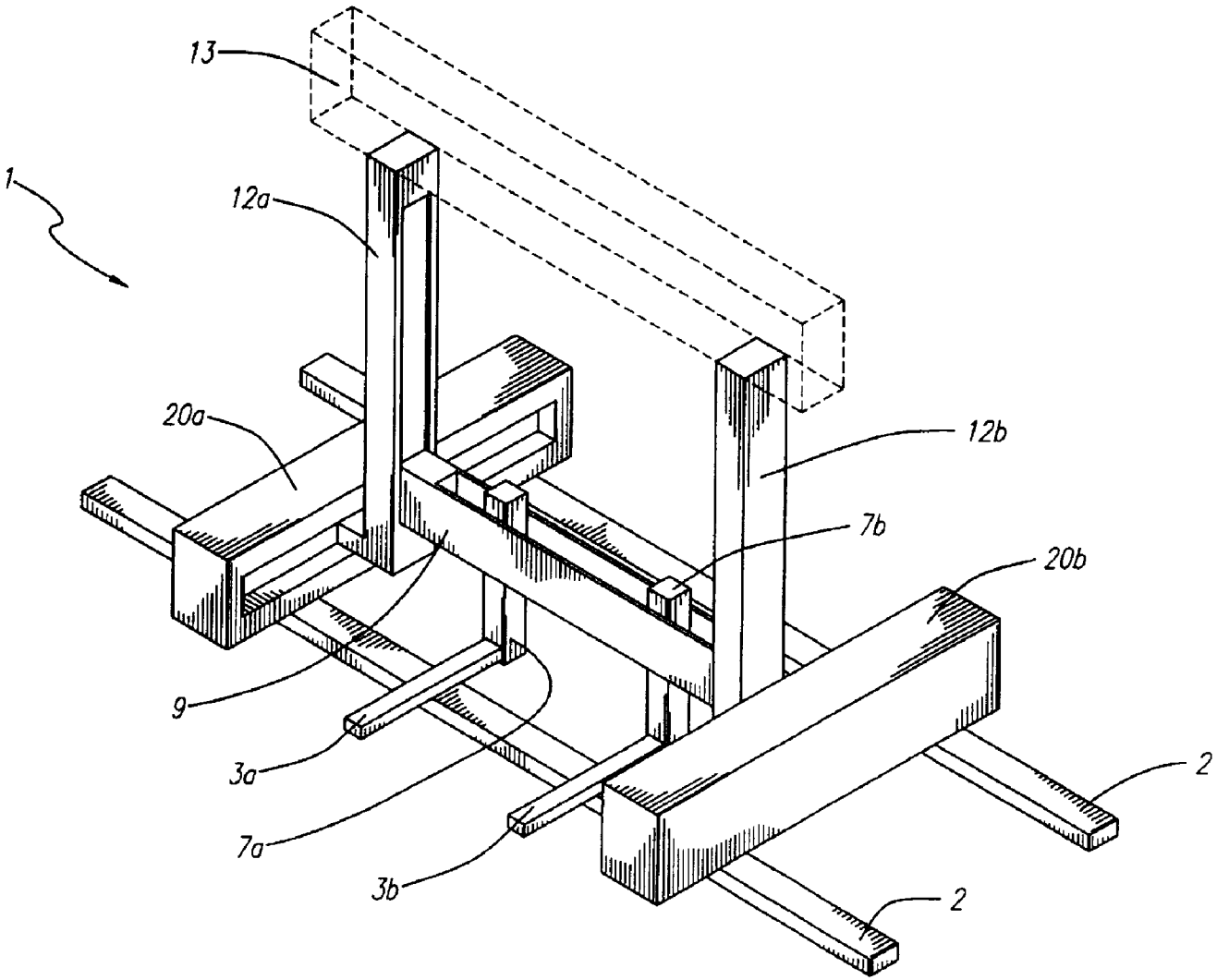
FIG. 1 is a perspective overall view of a fork lift constructed and operative in accordance with one embodiment of the invention.

In reference to FIG. 1, there is shown a fork lift 1 having two prongs—a front prong 3a and a rear prong 3b. Prongs 3a and 3b engage the load to be lifted (not shown) from the ground, from underneath, when positioned as in FIG. 2. Prongs 3a and 3b are supported and retractably engaged to a front and rear uprights 7a and 7b, respectively. Prongs 3a and 3b can be maneuvered to extend to the position suitable for lifting loads from one side of the fork lift (or of the loading vehicle - such as truck 8 in FIG. 2) or from the other side thereof, and to assume any position in between above the vehicle's chassis 2, in FIGS. 1 and 2. Usually, the maneuvering of prongs 3a and 3b is simultaneous and symmetrical, to ensure the necessary horizontal support of the lifted loads and to avoid dangerous collision with chassis 2. However, for special tasks, each prong 3a or 3b can be maneuvered separately, as required for instance for lifting of loads from sloping surfaces.

Uprights 7a and 7b extend from a longitudinal beam 9 and can be displaced along beam 9 in order to adapt to the size of the load to be lifted. Equi-distancing of uprights 7a and 7b from the edges of beam 9, respectively, although not compulsory, will provide symmetrical distribution of the lifted weight along beam 9. The moving of uprights 7a and 7b along beam 9 may be carried out by two hydraulic pistons 8a and 8b as in the configuration shown for example in FIG. 2. Plungers 9a and 9b are coupled to uprights 7a and 7b at joints 10a and 10b, correspondingly. Meshing piston housings 10a and 10b are rigidly secured to beam 9. As plungers 9a and 9b reciprocate through piston housings 10a and 10b uprights [3a and 3b] *7a and 7b* move along beam 9.

Longitudinal beam 9 is mounted to a front and a rear masts 12a and 12b. Beam 9 can raise or descent, with the aid of a suitable mechanism in a downward-upward motion along the front and rear masts and thus provide the lifting of the loads. Alternatively, the required lifting can be provided by a vertical motion of uprights 7a and 7b with regard to said beam 9 such as generally suggested in an alternate embodiment of the fork lift in FIG. 7a.

Figure 2:
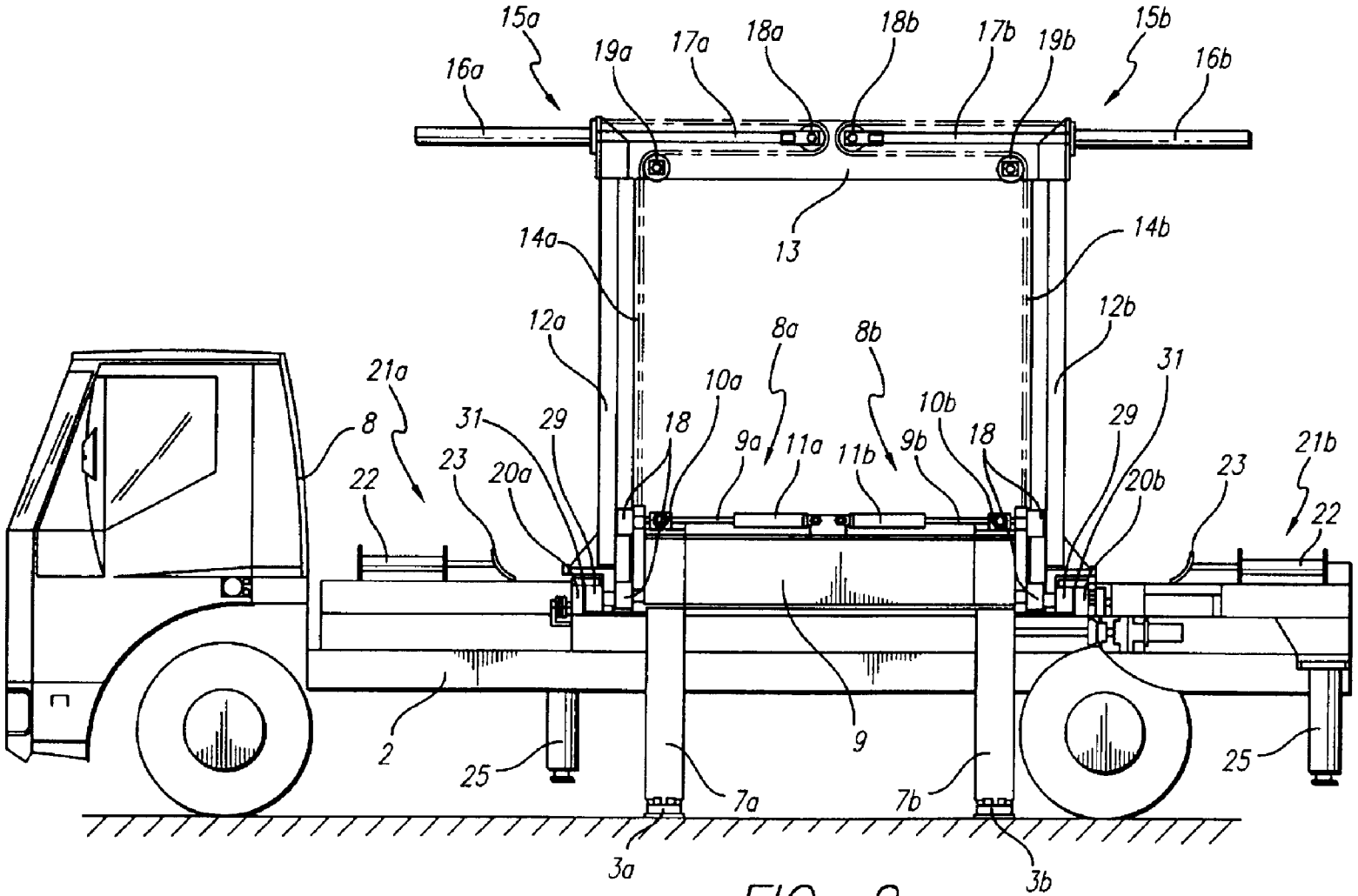
FIG. 2 is a cross-sectional side view of the embodiment of FIG. 1.

Preferably, masts 12a and 12b are coupled at their tops to a boom 13, providing extra strength and stability to the whole structure of the fork lift. In addition, boom 13 can be used as a stable support for a suitable lifting mechanism of beam 9. Such mechanism can be provided as shown in FIG. 2. Lifting chains 14a and 14b are coupled at one end to beam 9 and at the other end to hydraulic pistons 15a and 15b, which are mounted on boom 13. Hydraulic pistons 15a and 15b comprise corresponding piston housings 16a and 16b - rigidly secured to boom 13, and further comprise plungers 17a and 17b having pulleys 18a and 18b mounted at their edges. Chains 14a and 14b are connected to boom 13 in proximity of housings 16a and 16b and are correspondingly curled around pulleys 18a and 18b and pulleys 19a and 19b that are mounted on boom 13 in proximity to masts 12a and 12b. As apparent from FIG. 2, when plungers 17a and 17b move a distance X, beam 9 is lifted or lowered a distance of 2X (twofold leverage). It is understood that a threefold or quadrafold pulling length can be analogously arranged.

Masts 12a and 12b are coupled at their bottom to a front and a rear transverse girders 20a and 20b, correspondingly. Guiding wheels 18 are mounted on beam 9 which roll in meshing rails along masts 12a and 12b, as shown in FIGS. 1, 3a, 3b and 5. Wheels 18 allow smooth raising and lowering of beam 9 along masts 12a and 12b.

Girders 20a and 20b are adapted to be coupled firmly to chassis 2 and comprise means for simultaneously reciprocating Masts 12a and 12b along girders 20a and 20b and thus provide the necessary transverse movement of the lifting mechanism towards both sides of the fork lift.

As shown in FIG. 2, the above structure is suitable for lifting loads from either side of a truck 8. Truck 8 may be substituted, for example, by a trailer or any other suitable cart or vehicle. Such trailer or cart can be easily designed (unlike conventional trucks for general purposes) to adapt to special needs, such as low chassis - suitable for city-car-towing or for loading in a warehouse, for saving lifting time and energy. For lifting of several loads, a series of fork lifts may be installed either on a long vehicle or on a series of trailers, and even train carts, as suitable.

In the position shown in FIG. 2, the fork lift is ready to initiate a lifting and loading phase or complete an unloading phase for a load located on the left side of *the* vehicle 8. Such position would be compatible to locations of masts 12a and 12b in the leftmost (the nearest) parts of girders 20a and [12b] *20b* as better seen in FIG. 1.

In FIG. 1, prongs 3a and 3b of the fork lift are resting upon chassis 2—a situation suitable for the fork lift when not in use. When the load is already loaded over the vehicle, the location of masts 12a and 12b would be in the rightmost or leftmost (the farthest or the nearest) side of girders 20a and 20b. During the process of loading, when the load is already lifted, beam 9 is held at a sufficiently high position which ensures free passage of the load over the vehicle chassis 2, and is slightly lowered in order to place the load on the floor or deck of vehicle 8 and enable the release of the lifting mechanism from the load.

The motions of all the operative parts of the fork lift—such as the motions of prongs 3a and 3b, uprights 7a and 7b, beam 9 and masts 12a and 12b, may be combined or simultaneous, and any suitable controlling device may be associated with the relevant driving means of these parts for their manual or computerized motion control.

If the load is a car, prongs 3a and 3b may be spread out until they engage the wheels of the car, in order to lock the wheels of the car. Alternate locking devices, such as devices 21a and 21b in FIG. 2 can be mounted in the front or the rear part of vehicle 5 to prevent the movement of the load during its transportation. In the example of FIG. 2, devices 21a and 21b comprise hydraulic pistons 22 which pushes or pulls lockers 23 toward the edges of the loaded car or its wheels.

Optionally, a set of 4 telescopic extendible strut poles 25, as shown in FIG. 2, is rigidly secured to chassis 2 for providing additional security against turning over of the loading vehicle 8 during the process of loading and unloading.

Figure 3A:
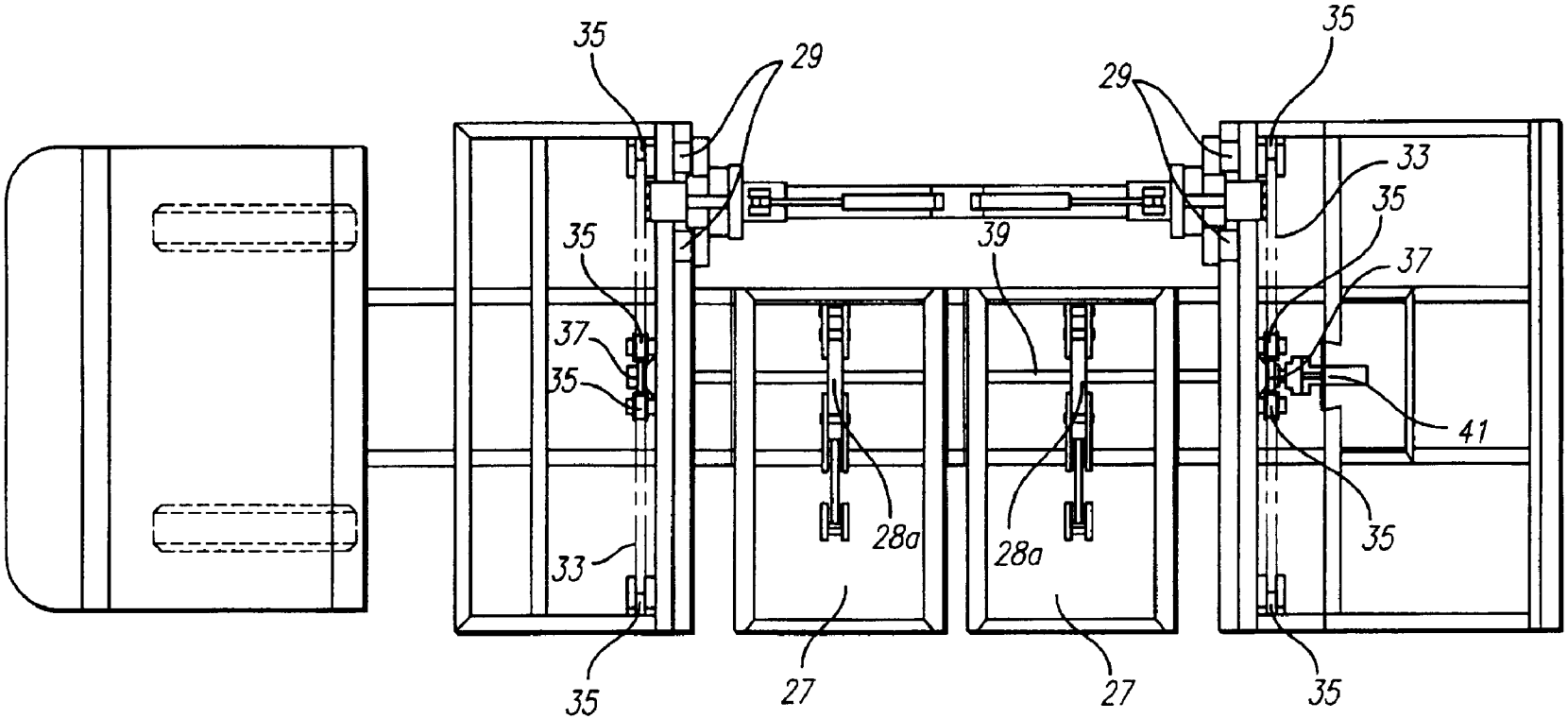
FIGS. 3a–3b are a cross-sectional top views of the embodiment of FIG. 1.
Figure 3B:
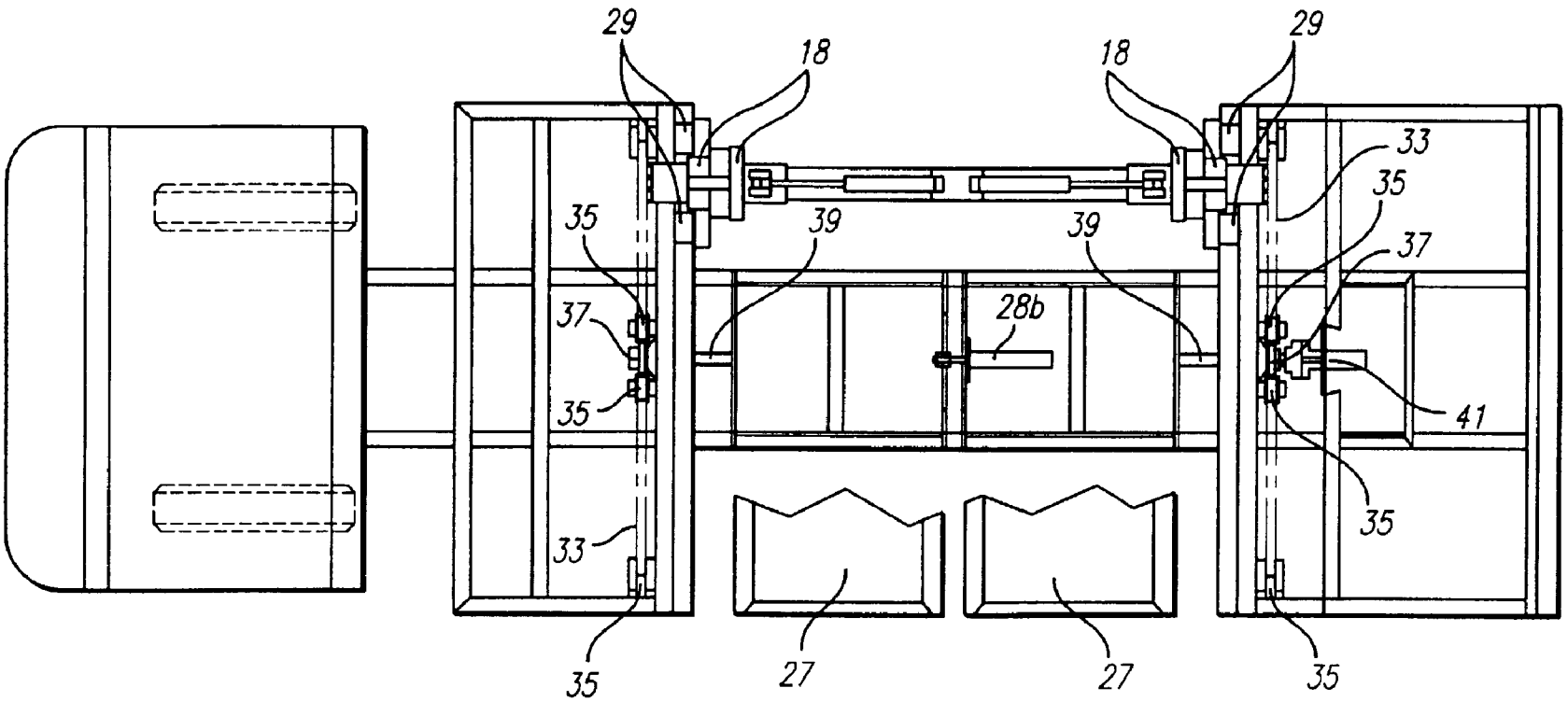

Optionally, the deck floor of vehicle 8 can be of a retractable or collapsible kind, such as with sliding platforms 27 in FIGS. 3a and 3b, or vertical plates (not shown) which can be turned to a horizontal configuration. Collapsible or maneuverable deck floor is required when a permanent floor is not wide enough to carry the loads. In the example shown in FIGS. 3a and 3b, platforms 27 are maneuvered transversally by pistons 28a and longitudinally by pistons such as 28b.

Figure 4:
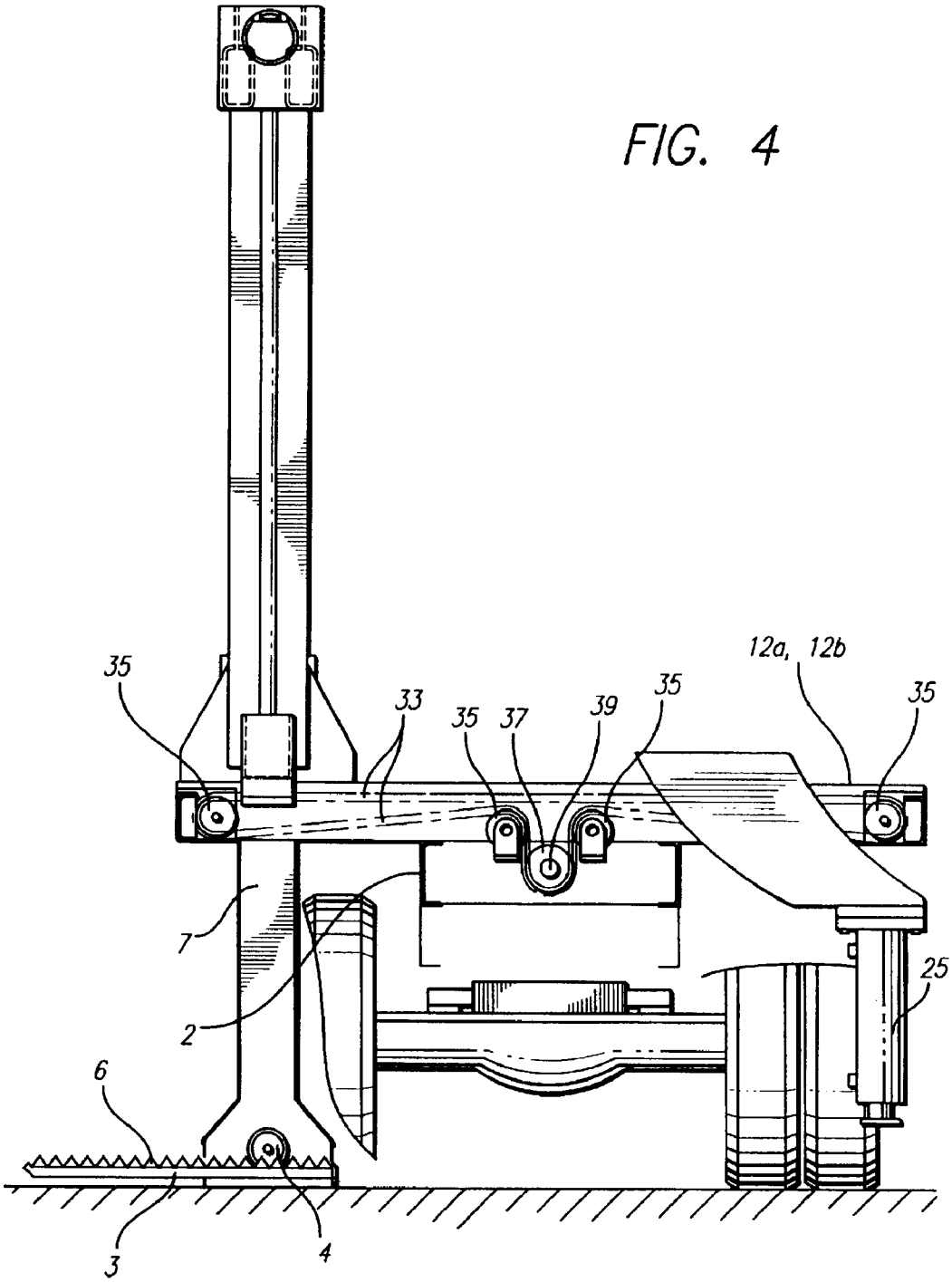
FIGS. 4 and 5 are a cross-sectional front view of the embodiment of FIG. 1.

The mechanism for reciprocating masts 12a and 12b along girders 20a and 20b is shown in FIGS. 1, 2, 3a, 3b and 4. Each of masts 12a and 12b comprises wheels 29 which roll in meshing rails 31 along girders 20a and 20b, as best seen in FIG. 2. Wheels 29 ensure a smooth slide of masts 12a and 12b along girders 20a and 20b. Masts 12a and 12b are firmly connected to chains 33 as best seen in FIGS. 3a, 3b and 4. Sprocket chains 33 are tightly stretched by guiding wheels 35—which are mounted on girders 20a and 20b, and sprocket wheels 37 which serve as the drivers of sprocket chains 33. Sprocket wheels 37 are coupled to shaft 39—which is propelled by a drive such as a hydraulic drive 41 in FIGS. 3a and 3b. The interconnection of sprocket wheels 37 to a common shaft 39 guarantees the simultaneously parallel motions of masts 12a and 12b.

Figure 5:
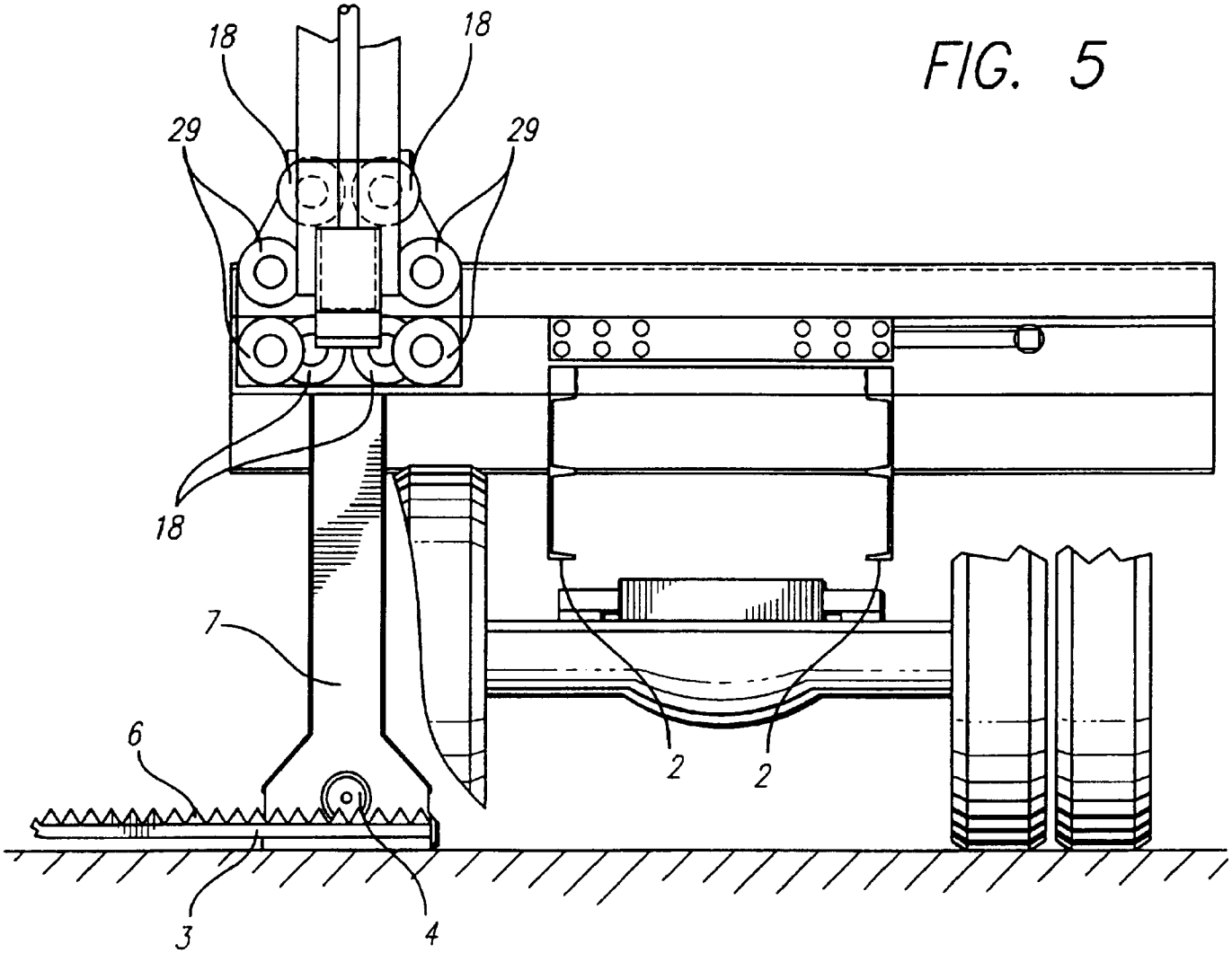

Prongs 3a and 3b can either simultaneously or separately extend from uprights 7a and 7b, by a driving mechanism as shown in FIGS. 4 and 5: Prong 3 is reciprocated by a sprocket wheel 4, which is preferably actuated by a hydraulic drive, and which is mounted on upright 7. Sprocket wheel 4 revolves against mating toothed sprocket bar 6 which is mounted on prong 3.

Alternate pivotal prongs 3 are shown in FIGS. 6a(1), and 6b(2). Simple bar shaped prongs 3 can pivot 180° in direction 'r' - either horizontally, as in FIGS. 6a(1) and 6a(2), or vertically, as in FIG. 6b. Further optionally, telescopic prongs as prong 36 in FIG. 6a(2) and prong 3a in FIG. 8 may be used. Alternate pivotal prongs that are L-shaped and which can pivot 90°, horizontally or vertically, are demonstrated in FIGS. 6c and 6d.

Prong 3 may comprise a split prong, as shown in FIG. 6e, which is useful for lifting and loading cars, whereby prong 3 is adapted to lift two car wheels 52 and another similar prong (not shown) would similarly lift the other two wheels of a car. Such prongs can provide the lock necessary to maintain the loaded car in a stable state during transportation. Split prong 3, for instance, may be pivotally mounted to upright 7, as in FIG. 6e, for enabling its extension by its pivoting toward the other side of a lifting truck. Alternately, split prong 3 may be reciprocated to both sides of the truck, in a way analogous to the one shown in FIGS. 4 and 5, and comprise articulated splitting mechanism, as in the examples shown in FIGS. 6f(1) and 6f(2).

Notably, although the invention is primarily designed for lifting on the side of the loading vehicle, it is possible to install the lifting mechanism for rear or frontal lifting.

Referring now to FIG. 7a, there is shown an alternate embodiment of the lift fork. Heightened transverse girders 20a and 20b are firmly secured to chassis 2. Longitudinal beam 9 reciprocates along girders 20a and 20b as in FIG. 1. Extendible or pivotal Prongs 3a and 3b are coupled to uprights 7a and 7b as in any of FIGS. 1 or 6a to 6d. The lifting of prongs 3a and 3b may be provided by vertical reciprocation of uprights 7a and 7b upon beam 9, by using any suitable mechanism, such as analogous to the piston-propelled chains 14a and 14b in FIGS. 1 and 2, and by using optional boom 13 shown in perforated lines in FIGS. 7a and 7c. Alternate lifting devices may use toothed wheels and meshing toothed bars analogous to sprocket 4 and bar 6 in FIGS. 4 and 5.

A further alternate lifting device may be provided by guiding beam 9 through rails such as rails 41 in FIG. 7a. Girders 20a and 20b may comprise extended legs 43 through which beam 9 reciprocates vertically. This can possibly be carried out by means of toothed wheels 45, shown in FIG. 7b, which are turned against mating toothed inner walls 47 of rail 41. Wheels 45 are mounted on the edge of beam 9 and their coordinated revolving will reciprocate beam 9 either vertically or horizontally through rails 41.

The support of beam 9 by girders 20a and 20b can be re-enforced, such by branch 49 in FIGS. 7a and 7c, which is inserted across rails 41 and may be further enhanced with the aid of an enclosing member 51. If the support of beam 9 by girders 20a and 20b is satisfactory and boom 13 is not employed, beam 9 may be separated into two beams 9' and 9", if the middle chunk 9" is taken off in such configuration the distancing of prongs 3a and 3b may be provided by longitudinal motion of any of the girders 20a and 20b along chassis 2, using suitable reciprocating means.

Another alternate fork lift is demonstrated in FIG. 8. Arches 20a and 20b are rigidly secured to chassis 2. Longitudinal beam 9 is coupled to arches 20a and 20b and can be maneuvered along arches 20a and 20b, using any suitable driving means such as toothed wheels and bars analogous to those shown in FIG. 7a. The arcuate track along arches 20a and 20b, combines both the required lifting and the transverse carriage of the loads. Prongs 3a and 3b are extendible or pivotal and are coupled to beam 9 in any suitable manner such shown in the previous examples. Arches 20a and 20b may comprises telescopic extensions such as member 25 in order to allow the lowering of prongs 3a and 3b to the ground. Such member can also function as a strut pole similar to strut poles 25 in FIG. 2. Alternatively, intermediate upright such as 7b in FIG. 8 can provide the necessary lowering of the prongs.

In order to ensure the permanently horizontal position of prongs 3a and 3b which is essential for the appropriate lifting, stabilizing or balancing means need to be applied. Such stabilizing means may comprise pivotal joints such as joint 51 having a suitable gear and which is controlled by a predetermined program in correlation to the position along arches 20a and 20b, or in real time by gyroscopic, manual or computerized controller. Alternate stabilizing means can be provided by coupling beam 9 with rectilinear guide such as mechanical guide 53 in FIG. 9a. T-shaped member 55 is rigidly coupled to beam 9 and comprises a horizontal rail (not shown) along its upper section 57. Reciprocatable bridging bar 59 is connecting section 57 to guide 53. Bar 59 can slide along section 57 which remains perpetually horizontal. Guide 53 comprises a rail compatible to sliding of bar 59 all along thereof The confinement of bar 59 to horizontal movement at its connection to section 57 and to vertical movement at its connection to guide 53 ensures the permanently horizontal position of section 57 and prong 3.

Alternate stabilizing means 61 are shown in FIG. 8 and are presented in more detail in FIGS. 9b and 9c. Beam 9 is rigidly coupled to frame 61. Frame 61 encompasses arch 20a and comprises elliptical internal projections 63 and 65 which are rigidly coupled with rod 66. Projection 63 is a vertical ellipse and projection 65 is a horizontal ellipse. Compatible guiding grooves 67 and 69 shown in FIG. 9c are mounted on the sides of arch 20a and guide projections 63 and 65 correspondingly. Groove 67 is designed to allow free movement of vertical projection 63 therethrough, but its lower sections are gradually narrowed—to constrain the rotation of projection 63. Similarly, groove 69 is designed to allow free movement of horizontal projection 65 therethrough, but its upper section is gradually narrowed—to constrain the rotation of projection 65. The combined constraints imposed on the rotations of projections 63 and 65, guarantees the conservation of the horizontal position of beam 9, and hence—of prongs 3a and 3b.

It will be appreciated by those skilled in the art that the invention is not limited to what has been shown and described hereinabove by way of example only. Rather, the invention is limited solely by the claims which follow.

We claim:

[1. A fork lift comprising retractably extendible loading prongs for lifting loads from either side of a vehicle, and a mechanism for displacing said prongs over and across said vehicle, said mechanism for displacing said prongs comprising:

a front transverse girder and a rear transverse girder, said transverse girders adapted to be rigidly secured to a chassis of said vehicle;

a front mast and a rear mast, each of said masts extending generally horizontally and having a top and a bottom;

means for simultaneously reciprocating said front and rear masts at their bottoms along said front and rear girders, respectively;

a longitudinal beam coupled to said front and rear masts;

means for reciprocating said longitudinal beam in a downward-upward motion along said front and rear masts; and a front upright and a rear upright, each of said uprights extending downward from said horizontal beam, wherein at least one of said retractable extendible prongs extends from each of said uprights.]

[2. A fork lift as in claim 1, wherein said prongs comprise front and rear transverse prongs retractably engaged to the bottoms of said front and rear uprights, correspondingly, and means for extending said front and rear transverse prongs from said front and rear uprights, correspondingly, toward either side of said vehicle.]

[3. A fork lift as in claim 2, wherein said beam comprises means for lowering or raising said front or rear uprights.]

[4. A fork lift as in claim 2, wherein said means for simultaneously reciprocating said front and rear masts along said front and rear girders, comprise sprocket wheels, wherein at least one sprocket wheel is mounted on each mast and is turned against mating toothed sprocket bars which are mounted on said front and rear girders, respectively.]

[5. A fork lift as claim 4, wherein said sprocket wheels are propelled by a hydraulic drive.]

[6. A fork lift as in claim 2, comprising a boom to which said front and rear masts are coupled at their tops.]

[7. A fork lift as in claim 6, wherein said means for reciprocating said longitudinal beam in a downward-upward motion comprises front and back hydraulic pistons mounted on said boom, wherein each piston is coupled to a chain which is connected to said beam, through a system of pulleys.]

[8. A fork lift as in claim 2, wherein said means for extending said front and rear transverse prongs from said front and rear uprights, comprises sprocket wheels, each having a hydraulic drive, wherein each sprocket wheel is mounted on each upright and is turned against mating toothed sprocket bars which are mounted on said front and rear transverse prongs.]

[9. A fork lift as in claim 2, wherein said beam comprises means for longitudinally moving said front or rear uprights along said beam.]

[10. A fork lift as in claim 9, wherein said means for longitudinally moving said front or rear uprights along said beam comprises hydraulic pistons.]

*11. A method of lifting loads from either side of a vehicle, said method comprising the steps of:*

*providing a fork lift that comprises*

*a front transverse girder, and*

*a rear transverse girder, said transverse girders adapted to be rigidly secured to a chassis of said vehicle,*

*a front mast and a rear mast, each of said masts extending generally vertically and having a top and a bottom,*

*means for simultaneously reciprocating said front and rear masts at their bottoms along said front and rear girders, respectively,*

*a longitudinal beam coupled to said front and rear masts,*

*means for reciprocating said longitudinal beam in a downward-upward motion along said front and rear masts,*

*a front upright and a rear upright, each of said uprights extending downward from said longitudinal beam, and*

*retractably extendable loading prongs, at least one of said retractably extendable prongs extends from each of said uprights and said prongs comprise split prongs adapted to lift two wheels of a car;*

*rigidly securing said fork lift to said vehicle;*

*horizontally extending the retractably extendable loading prongs over and across said vehicle;*

*vertically lowering said prongs to the ground;*

*positioning said prongs securely underneath a load to be lifted;*

*vertically raising said prongs with the load;*

*displacing said prongs with the load over and across said vehicle; and*

*vertically lowering said prongs to rest the load on said vehicle.*

*12. A method of lifting vehicles having front wheels and rear wheels from either side of a second vehicle with a fork lift, the fork lift including at least one retractably extendible loading prong and a mechanism that displaces the at least one prong, the mechanism including a first transverse girder and a second transverse girder, a first mast having a top and a bottom and a second mast having a top and a bottom, a beam coupled to the masts, at least one member, having a first member and a second member, extending from the beam, a first sub-mechanism, and a second sub-mechanism, the at least one prong having a first split prong and a second split prong, the first split prong extends from the first member, the second split prong extends from the second member, the method comprising:*

*securing the first and second girders to the vehicle;*

*displacing the at least one prong over and across the vehicle with the mechanism;*

*simultaneously reciprocating the first and second masts at their bottoms along the girders with the first sub-mechanism;*

*reciprocating the beam along the first and second masts with the second sub-mechanism; and*

*lifting the vehicle from either side of the second vehicle with the at least one prong by*

*(i) engaging the first split prong and the front wheels at a first location and a second location; and*

*(ii) engaging the second split prong and the rear wheels at a first location and a second location.*

*13. The method of claim 12, wherein the simultaneously reciprocating the first and second masts at their bottoms along the girders with the first sub-mechanism comprises turning a sprocket wheel against a mating toothed sprocket bar.*

*14. The method of claim 13, further comprising turning the sprocket wheel against the mating toothed sprocket bar with a hydraulic drive.*

*15. The method of claim 12, wherein the reciprocating the beam along the first and second masts with the second sub-mechanism comprises operating a hydraulic pulley system.*

*16. The method of claim 12, wherein the displacing the at least one prong over and across the vehicle comprises turning a sprocket wheel against a mating toothed sprocket bar with a hydraulic drive.*

*17. The method of claim 12, comprising translating the at least one member.*

*18. The method of claim 12, comprising angularly moving the at least one member.*

*19. The method of claim 12, comprising angularly moving the first and second members.*

* * * * *